United States Patent [19]

Miller

[11] 4,322,576
[45] Mar. 30, 1982

[54] MESSAGE FORMAT FOR SECURE COMMUNICATION OVER DATA LINKS

[75] Inventor: William J. Miller, Miami Beach, Fla.

[73] Assignee: Racal-Milgo, Inc., Miami, Fla.

[21] Appl. No.: 108,039

[22] Filed: Dec. 28, 1979

[51] Int. Cl.³ ............................................... H04L 9/00
[52] U.S. Cl. .................................. 178/22.07; 370/99; 375/106; 178/22.17
[58] Field of Search ...................... 178/22; 375/2, 117, 375/36, 106, 107, 112, 114, 116; 370/49, 99

[56] References Cited

U.S. PATENT DOCUMENTS 4,160,120 7/1979 Barnes et al. ............................ 375/2
4,203,166 5/1980 Ehrsam et al. .......................... 375/2

OTHER PUBLICATIONS

"Security of Computer Communication", Bronstad, *IEEE Communications Society Magazine*, vol. 16, No. 6; Nov. 1978, pp. 33–40.

*Primary Examiner*—Howard A. Birmiel
*Attorney, Agent, or Firm*—Jackson, Jones & Price

[57] ABSTRACT

Communication over data links using binary synchronous protocol that is to be made secure according to the Federal data encryption standard (DES) is enhanced by utilizing an encrypted message format wherein the initialization vector for the DES algorithm is at the trailing end of the message. Additional information or control words may also be strung at the trailing end of the encrypted message format without causing throughput loss while enhancing the security and flexibility of the encrypted message in both point-to-point and multipoint systems.

18 Claims, 16 Drawing Figures

MESSAGE FORMAT FOR SECURE COMMUNICATION OVER DATA LINKS

BACKGROUND OF THE INVENTION

1. Field of the Invention

The present invention relates to communication over data links that utilize binary synchronous protocol and more particularly to a new and improved message format for encrypted messages in binary synchronous protocol type data link communication systems.

Description of the Prior Art

Date communication systems utilizing the data link concept are well known in the prior art. A data link comprises the communication lines, modems and other communication equipment which is used in the transmission of data information between two or more stations or terminals. The terminal equipment making up a station can vary from the basic send/receive reader and a printer to a control unit with several input/output devices attached. The communication lines and other facilities are usually supplied by communication common carriers, or equivalent facilities may be provided by the individual establishing the data link. The specific modem or data set equipment used at each station of the data link is determined by the type of communication channels used and the operational speed of the terminal equipment located at each station.

All transmission of data is over the communication line as a sequence of binary coded signals. Control of the data link is accomplished by the transmission and recognition of special line control characters.

The binary synchronous communication protocol (BSC) provides a set of rules for synchronous transmission of binary coded data. All data in BSC is transmitted as a serial stream of binary digits (0 and 1 bits). Synchronous communication means that the active receiving station on a communication channel operates in step with the transmitting station through the recognition of a specific bit pattern (synch pattern) at the beginning of each transmission block.

The BSC protocol can accommodate three specific transmission code sets. Each of these code sets consist of graphic characters (numeric, alphabetic, special), functional characters, (horizontal, tab, delete) and data link characters (start of heading, start of text, etc.). Each code provides different capacities for total graphic and functional assignments and these capacities reflect the flexibility of each of these codes. These codes are well known in the art as extended binary coded decimal interchange code (EBCDIC), United States of America Standard Code for Information Interchange (USASCII), and six-bit transcode.

The data link can be designed to operate either point to point (two stations), or multipoint (two or more stations). For point to point operation, a contention situation exists whereby both stations can attempt to use the communication lines simutaneously. To minimize this possibility, a station bids for the line using certain control characters such as the inquiry character (ENQ). Thus, a series of characters such as synchronize (SYN) and inquiry (ENQ) provide the signalling scheme for requesting control of the line and leaves a maximum amount of time for line monitoring. If simultaneous bidding for the line occurs, one station persists in its bidding attempt to break the contention condition. Once the station gains control of the line, the message transmission can start.

In a multi-point system, one station in a network is designated as the central or master station. The remaining stations are designated as tributary stations. The central station controls all transmission within the multi-point data link by either polling or selecting the tributary stations. Polling is an invitation from the central station to a specific tributary to send data from the tributary station to the central. Selection is a request from the central station to one of the tributary stations instructing it to receive a data message from central. These polling and selection operation capabilities permit the central station to specify the transmitting station and to control the direction of transmission in the system. Each station in a multi-point data link is assigned a unique station address which is used to acquire a station's attention during either polling or selection. Each station address consists of from one to seven characters depending on the specific station requirements.

Once a station's attention is acquired and it responds affirmatively, message transmission can start. The message consists of one or more blocks of text data. The message is transmitted in text blocks to provide more accurate and efficient error control. The data in a text block is identified by a start of text character (STX). In addition, the data of each text block, except the last, is immediately followed by an end of transmission block character (ETB) or an intermediate block character (ITB). The data in the last block of text in a message is immediatley followed by an end of text character (ETX).

Because of the proliferation throughout modern society of high-speed, highly accurate diminished cost data link systems, serious problems concerning the security of the text data transmitted has come to the fore. The ordinary transactions that were once conducted in person, by telephone or by written correspondence are increasingly being conducted by way of the new data link transmission systems. These systems are susceptible to eavesdropping and forgery. One way to prevent tampering with data text transmitted over data links is by resorting to cryptography systems. Cryptography systems provide methods for encrypting or transforming information so that it is unintelligible and therefore useless to those who are not meant to have access to it.

The Nation Bureau of Standards, as a result of its responsibility for developing federal information processing standards, has suggested to the public a data encryption standard (DES) which utilizes a specific algorithm that performs a specific and unambiguous set of instructions. The DES algorithm designated by the National Bureau of Standards utilizes a unique parameter which is called a key. The algorithm was developed by the International Business Machines Corporation (IBM). IBM made the algorithm available to the National Bureau of Standards as a federal information processing standard. IBM has provided licensing procedures for building electronic devices that implement this algorithm. The algorithm itself was published in the Federal Register in March, 1975 (40 FR 12067).

The purpose of the DES is to provide a cryptographic method which would protect sensitive or valuable text data transmitted over computer systems and data link networks. The use of a myriad of different encryption algorithms would result in a fundamental incompatibily of data communication equipment. By providing a single data encryption standard, the DES, the needed basic compatibility of the communication network is assured.

The DES algorithm is basically a recirculating block product cipher of block size 64 which is based on a key length of 64 bits, eight bits of parity being included. The algorithm is completely specified in the National Bureau of Standards Federal Information Processing Standard publication. All details of the algorithm are publically known. The security of the text data in a system that utilizes the encryption-decryption algorithm is provided through the use of the key which is generated by each group of authorized users of a particular communication data link. This key is randomly generated and only distributed to each authorized user. The key must be protected and kept confidential. Any compromise of the key will compromise all data and resources that are encrypted by the use of that key.

Basically, the National Bureau of Standards data encryption standard algorithm specifies the encryption of 64 bits of data into a 64-bit cipher based on a 64-bit key, and the decryption of a 64-bit cipher into a 64-bit data block based on the same 64-bit key. Steps and the tables of the algorithm are completely specified and no options are left in the algorithm itself. Variations in implementing and using the algorithm provide flexibility as to its application in various places in a computer system or in a transmission network. Such variations include how the input is formulated, whether the data itself or some other source of input is used for the algorithm, how the key is generated and distributed, how often the key is changed, etc.

Basic implementation of the algorithm is most easily done by special purpose electronic devices. However, it can also be implemented by programming the execution of the algorithm into a microprocessor. Either way, the implementation of the algorithm is well within the purview of a person of skill in the art. The overall security provided by the algorithm is based on two primary requirements: secrecy of the encryption key, and reliable functioning of the algorithm.

The National Bureau of Standards, by way of publication of proposed Federal Standard No. 1026 and No. 1027 describes minimum security requirements which are to be satisfied in implementing the DES in a telecommunications environment. The Federal publication and Federal Standard No. 1026 and No. 1027 provide for three approved modes of implementation of the DES.

The cipher feedback mode is the one intended for the encryption and decryption of data for transmission over communication channels. Basically, the cipher feedback mode operation of the DES algorithm provides that the input to the algorithm is not the data itself but rather a string of output data that was previously generated by the cipher algorithm. The cipher feedback mode of operation has a memory system inherent in its design. At any time (t), the output depends on previous outputs of the algorithm. The operation of the algorithm is considered to be a link or chain mode operation. The transmitted cipher text is chained together in such a way that each cipher at any time (t) depends on all previous ciphers transmitted since the operation was initialized.

Initialization means that a 64-bit input (input vector) is generated at $t_1$ and put into the transmitter's (cipher algorithm) input register. From that time on, all the cipher text will depend on this initial input register fill.

In order to fill the receiver's input register, one of two events must occur at the initialization. One, the receiver must independently generate the identical initial fill, or, the transmitter must transmit sufficient cipher text to fill the receiver's input register with the same cipher text as was in the transmitter's input register at initialization.

In Federal Standard No. 1027, the National Bureau of Standards has defined the operation of initialization as the use of an initializing vector which is a minimum of 48-bits long. This initialization vector is supplied to the transmitter and transmitted to the receiver, as plain text, immediately before each message cipher text. When using synchronous communication protocol, a typical data message structure would be:

SYN, STX, [TEXT] ETX, BCC

An encrypted data message as described in Federal Information Processing Standard (FIPS) No. 46 would be as follows:

SYN, STX, [IV] [TEXT] ETX, BCC

The initialization vector [IV] would be a 8 bytes long (each byte being 8 bits) transmitted in the clear. The text is encrypted. The end of text character (ETX) is also encrypted. The block check character (BCC) is optionally encrypted.

The end of text character (ETX) is encrypted because the receiver, once it begins to decipher the cipher text received, cannot determine when to stop the deciphering process until it deciphers the end of text character. If the end of text character were transmitted in the clear, it is possible that the decipher processer could be triggered by cipher characters which could imitate the end of text character sent in the clear.

With the message format suggested by the NBS standard, should an error occur during transmission of the cipher text, the receiver would fail to decrypt properly because the transmitter and receiver would lose cryptographic synchronization. When that occurs, the receiver cannot detect the end of text character and will decrypt forever as long as characters are transmitted.

In certain data link networks, all transmissions are checked for errors using the block check character (BCC). These checks are done at intermediate nodes of the data link which do not have access to the secret key. Because in the message format suggested by the NBS, the ETX character and optionally the BCC character are encrypted, it becomes very cumbersome for the intermediate nodes to check for errors using the BCC character.

The NBS proposed standard format introduces the initialization vector [IV] to the bit stream of the data message following the STX character. The introduction of the initialization vector in the message format causes a delay equal to the length of the vector, 6 bytes. This delay causes a reduction in through-put for a two-way communication on the data link.

OBJECTS AND SUMMARY OF THE INVENTION

An object of this invention is to provide a message format for BSC protocol type encrypted data that is flexible, in that it can be used in both a point-to-point and multi-point environment without decreasing throughput.

Another object of this invention is to provide a message format for encrypted data that enhances the ability of a receiver to detect that an error occurred during the transmission of the encrypted text.

Yet a further object of this invention is to provide a message format for encrypted data that permits error checking of the encrypted message at intermediate nodes of a data link without deciphering the message.

These objects and the general purpose of this invention are accomplished as follows. In a BSC protocol format, the initialization vector as well as additional information words are placed at the end of the message. Beside the initialization vector which is at least 6 bytes long, information words (INF) and end of text (ETX) and block cipher (BCC) characters may be attached at the trailing end of the standard BSC format after the message ETX and BCC. The INF words may include signalling information for use between the encryption/decryption devices, abort (ABORT) characters and sequence characters (SEQ).

BRIEF DESCRIPTION OF THE DRAWINGS

Other objects and features of the invention will become apparent to those skilled in the art from consideration of the following description of a preferred embodiment of the invention as illustrated in the accompanying drawings in which like reference numerals designate like parts throughout the figures thereof and wherein:

FIG. 7 is an abstract illustration of the format for communication for a data link utilizing binary synchronous communication wherein the central terminal is communicating with several tributaries by selecting one of the tributary terminals to send messages to.

FIG. 8 is an abstract illustration of the NBS suggested message format for an encrypted message, encrypted according to the National Bureau of Standards DES algorithm in the cipher feedback mode.

FIG. 9 is an abstract illustration of a message format that can be used in a data link utilizing binary synchronous communications protocol wherein the message is encrypted according to the National Bureau of Standards DES alogrithm in the cipher feedback mode according to the present invention.

DESCRIPTION OF THE PREFERRED EMBODIMENTS

Figure 1:
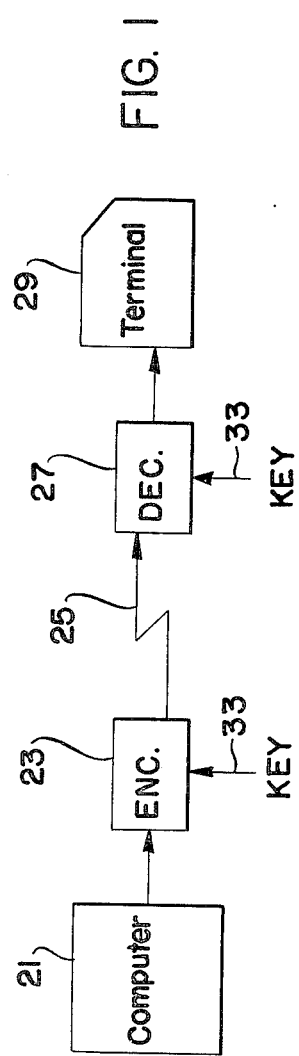
FIG. 1 is a generalized block diagram of a point to point data link using an encryption/decryption algorithm.

Referring first to FIG. 1, the basic concept of secure communication due to transmission of cipher text is illustrated. The terminal or data link consisting of a computer or terminal 21 at one end and a terminal which may be another computer, CRT display, etc., 29 at the other end is connected by a transmission medium 25. At the output of the computer, an enciphering device 23 receives the digital data from computer 21. Enciphering device 23 encrypts the data it receives, as directed by the secret key 33 supplied to it and according to the encryption algorithm by which it is controlled. The resulting cipher text is then transmitted over the transmitting medium 25 to the receiving end, terminal 29, where it is received initially by a decryption device 27. Decryption device 27 is also supplied with the secret key 33. The decryption device 27 deciphers the cipher text according to the decipher algorithm and the key 33 supplied to it. The deciphered text (plain text) is then supplied to the terminal 29 for its use.

The key utilized at the transmitting site by the encryptor device 23 is the same key that must be utilized at the receiving site by the decryptor 27. Transmission of the key from the transmitting end to the receiving end of the data link can take many forms. The key may be hand carried or transmitted over the transmitting medium. If the key is transmitted, it may be changed dynamically for each message sent by the transmitter to the receiver, but it must, in turn, be encrypted by a master key that does not change.

Figure 2:
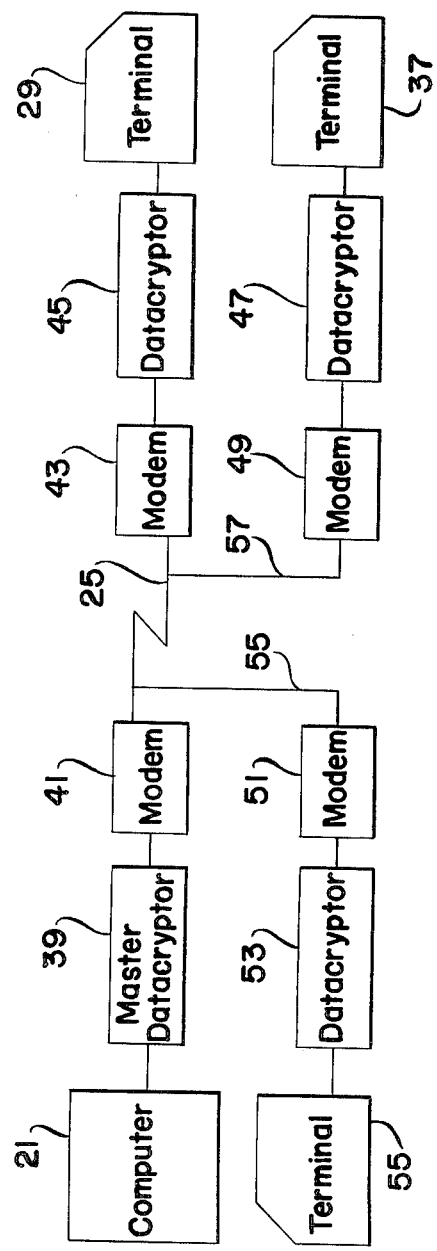
FIG. 2 is a block diagram of a multi-point data link utilizing an encryption/decryption algorithm.

Referring now to FIG. 2, a multi-point data link is illustrated wherein a central location comprising a computer 21 master DATACRYPTOR 39 and master modem 41 is communicating with a plurality of tributary receiver/transmitter units. The central location comprising of the computer 21, master DATACRYPTOR 39 and the master modem 41 directs the communication between the tributary terminals 29, 37 and 35 by polling or selection protocol. The master DATA-CRYPTOR 39, which is capable, according to the present invention of enciphering and deciphering, has the ability to store and utilize a plurality of secret keys uniquely assigned to individual tributary terminals.

In the system illustrated in FIG. 2, master DATA-CRYPTOR 39 would have three keys available to it, one for terminal 29, one for terminal 37 and one for terminal 35. Utilization of modems in a data link indicates that the transmission medium 25 could be a dedicated telephone line or lines issued to the user of the system or the general dial-up network.

Computer 21, along with modem 41 at the central site, will establish a two-way communication path between any one of the tributary locations in the data link system, either by polling or selection techniques. The tributary DATACRYPTOR units 45, 47 and 53 differ from the master DATACRYPTOR 39 to the extent that the master DATACRYPTOR is capable of storage and usage of more than one cipher-decipher key whereas the tributary DATACRYPTORS are not. In addition, the master data cryptor 39 is capable of generating new cipher keys that would be transmitted to the tributary data cryptors 45, 47, 53 over some convenient communication path. Modems 41, 43, 49 and 51 may be any of a number of modems which are well known in the art. They would be selected on the basis of the channels 25, 55 and 57 utilized in the multi-point data link. The channel used determines, to a great extent, the transmission speed of the data, the terminal at the central and tributary location also being an important factor.

Figure 3:
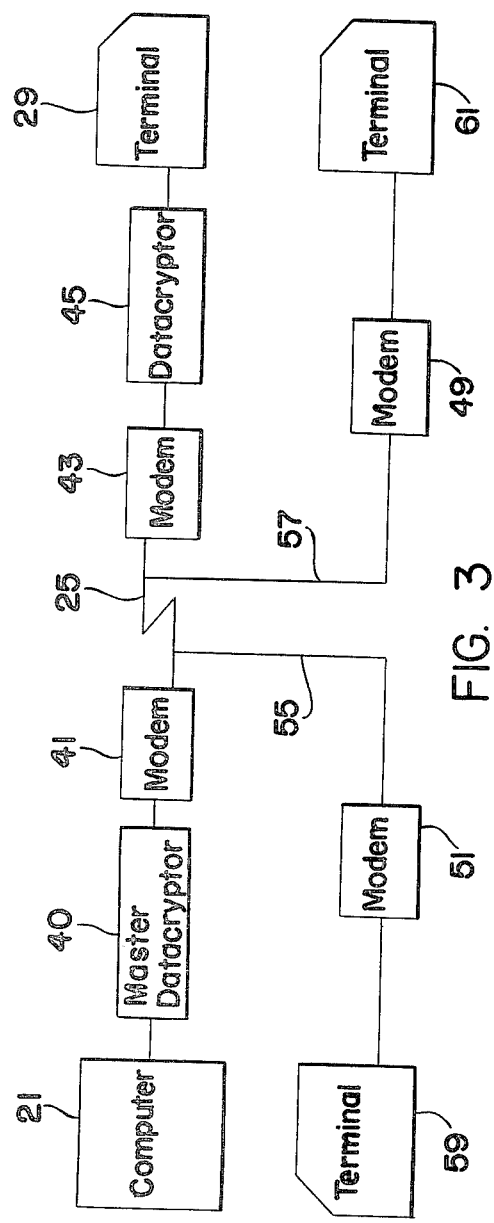
FIG. 3 is a block diagram of a multi-drop data link where only one leg of the data link utilizes an encryption/decryption algorithm.

Referring now to FIG. 3, a multi-point data link system is illustrated wherein only one drop in the system is set up for secure data transmission while the other drops can only transmit and receive clear text. The system of FIG. 3 does not differ basically from the system of FIG. 2 except that the central DATACRYPTOR 40, located at the central site with a computer 21 and the master modem 41, will only have one cipher key stored therein for use to perform the enciphering and deciphering of messages transmitted between computer 21 and terminal 29 which make up that portion of the data link which is to be secure. The other tributary units, terminal 61 and terminal 59, connected to the central site by way of transmission medium 55, 57 and modems 51, 49 respectively, transmit and receive data in the clear. When the central site computer 21 and modem 41 communicate with terminals 59 and 61 as a result of central site transmitter-receiver polling or selecting these tributaries, the master DATACRYPTOR 40 is essentially out of the circuit in that it does not perform its enciphering or deciphering function. Only when the central site is communicating with the tributary terminal 29 does the central DATACRYPTOR 40 perform its enciphering function when transmitting data and deciphering function when receiving data from tributary terminal 29.

The binary synchronous communication protocol (BSC) provides for the orderly management of two-way communication between a central and tributary station in either a point to point or multi-point data link system.

Figure 4:
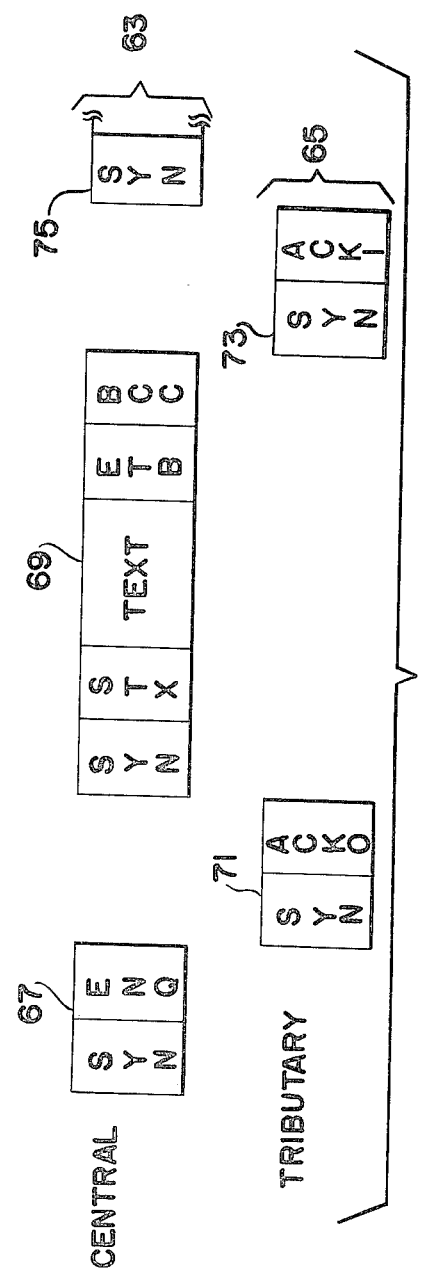
FIG. 4 is an abstracted illustration of the format for communication between a central and tributary terminal on a data link utilizing a binary synchronous communication format.

FIG. 4 illustrates a sequence of message formats between a central station 63 that wishes to transmit information to a tributary station 65 that is to receive the information. In bidding for a line in a point to point operation or in a multi-point operation, the central transmitter will send out a control block 67 that consists of synchronous characters and inquiry character. Synchronous is denoted (SYN) and inquiry is denoted (ENQ). As a general rule, the (ENQ) character is used to bid for the line in a point to point line connection. In a multi-point line connection, it is used to indicate the end of a poll or selection sequence. The tributary terminal responds to the (ENQ) character by transmitting to the central a control block and that consists of (SYN) characters and acknowledge characters (ACK0). The (ACK0) character is a positive response to a selection by the central in a multi-point system or a line bid by the central in a point to point system. An acknowledge response indicates that the receiver is ready to accept a block of data.

Accordingly, the central unit will transmit a data text block 69 which comprises synchronous (SYN) characters, start of text characters (STX), text, end of text block characters (ETB) and block check characters (BCC). The tributary receiving terminal 65, in response to the (ETB) characters, looks for the (BCC) characters and utilizes it to check for errors in the transmitted data of that text block. If no errors occurred, the tributary receiver 65 responds by sending a control block 73 back to the central transmitter which consists of (SYN) characters and acknowledge characters (ACK1). The (ACK1) character indicates to the central transmitter that the previous block of text data was received without error and the next block of text data may be transmitted. Accordingly, the central, if it has additional data to transmit, would start again with another text block like text block 65 starting with synchronous characters (SYN) 75.

Figure 5:
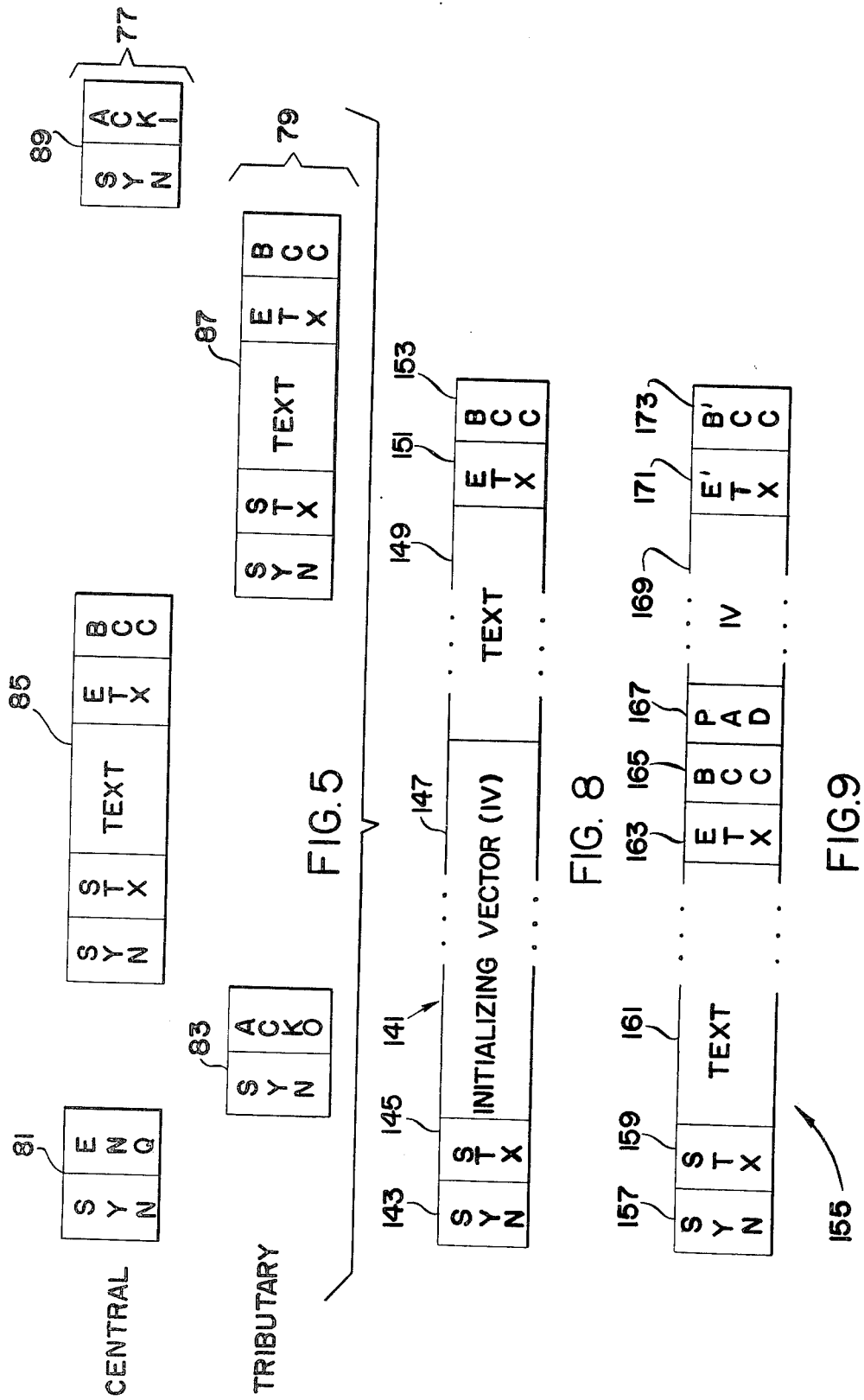
FIG. 5 is an abstract illustration of the format for communication between a central and a tributory terminal utilizing a binary synchronous communication format.

Referring now to FIG. 5, communication between a central and a tributary terminal illustrating the message formats for a limited conversational mode is illustrated. The central transmitting terminal would bid for the line in a point to point system by transmitting a control block 81 which consists of (SYN) characters and (ENQ) characters. Response from the tributary would be a control block 83 consisting of (SYN) characters and (ACK0) characters. Upon receiving the (ACK0) characters, the central would transmit its message block consisting of (SYN) characters, STX characters, text, and if that was all the central wished to transmit, end of text characters (ETX), and (BCC) characters. Upon receiving (ETX) and (BCC) characters, the tributary may, if it wishes to transmit data to the central, respond with a text block 87 rather than the (ACK1) control block shown in FIG. 4.

The conversational response of tributary 79 to central 77 is by transmitting a text block 87 to the central. The text block comprises the (SYN) characters, (STX) characters, text data, (ETX) characters and (BCC) characters. The central would respond to the reception of this text block by checking for errors in the received data. If no errors occurred, central would transmit a control block 89 to the tributary 79 which comprises (SYN) characters and (ACK1) characters.

Figure 6:
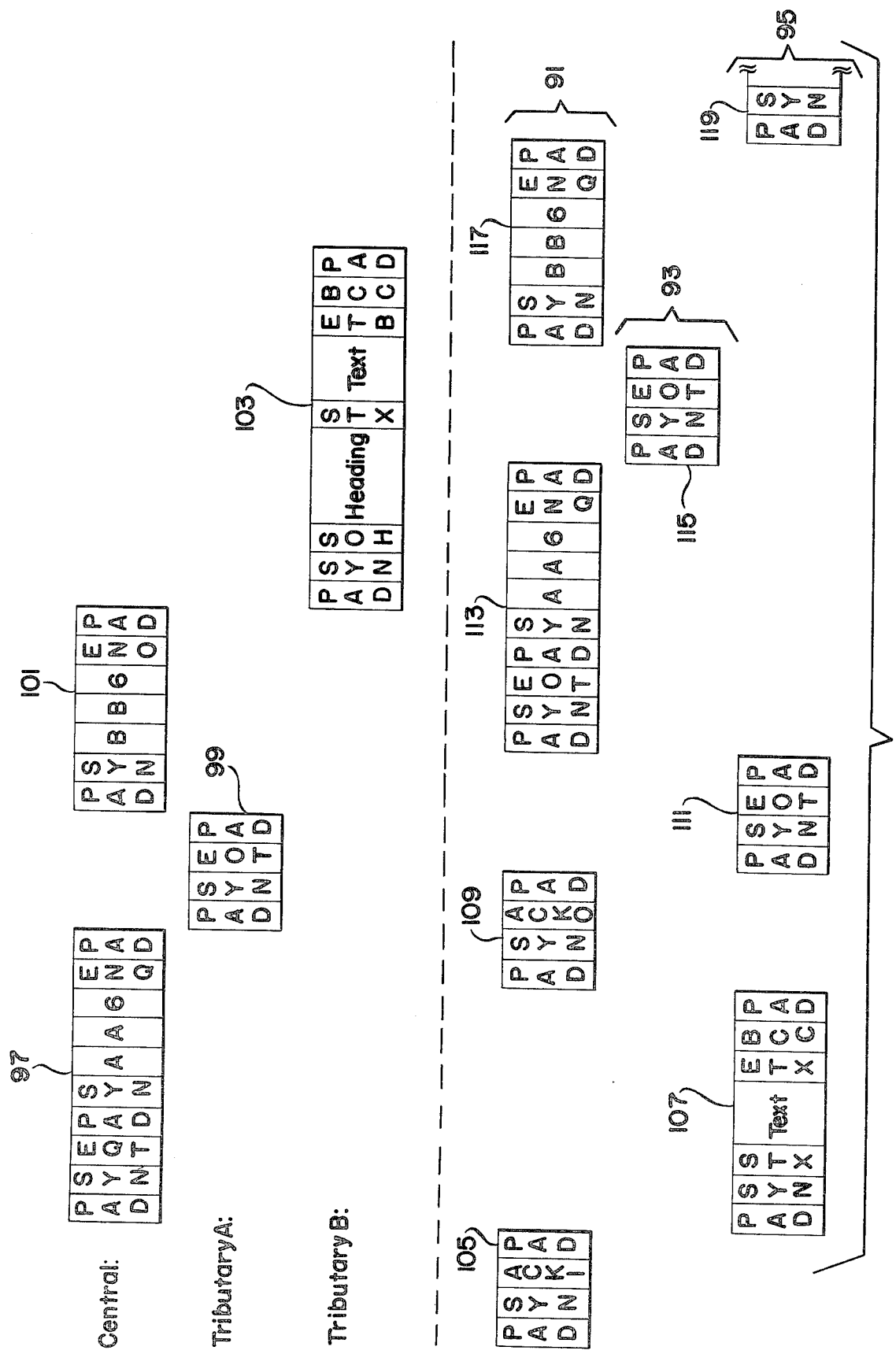
FIG. 6 is an abstract illustration of the format for communication between a central and two tributary terminals utilizing binary synchronous communication wherein the central terminal is polling both tributaries to see if they wish to communicate with the central.

Referring now to FIG. 6, the formatting of message traffic for multi-point operation wherein a central station polls two different tributary stations is illustrated. It will be remembered that in the polling mode, the central station is requesting a series of tributary terminals whether they wish to transmit data to the central terminal. FIG. 6 illustrates a central terminal 91 communicating with a Tributary A, terminal 93 and a Tributary B, terminal 95.

To start the sequence, the central terminal 91 sends out an initialization control block 97 which consists of pad characters (PAD), (SYN) characters, end of transmission characters (EOT), another (PAD) character, a (SYN) character, several station identification characters (A) for station A, and a specific equipment identification character (6) which could be a reader, (ENQ) characters and another (PAD) character. The (EOT) character is utilized to reset all the tributary stations on the line. The (ENQ) character is used to indicate the end of a poll sequence. The (PAD) characters, which may consist of a series of all binary 1's, ensures the full transmission and reception of the first or last significant bits of the previous character. The (SYN) characters merely assure that the receiving stations are in step with the sending stations.

Because the initialization sequence block 97 addresses tributary terminal A, terminal A responds by a control block 99 which includes (PAD) characters, (SYN) characters, (EOT) characters and another (PAD) character. This response indicates that terminal A has nothing to transmit. During the time that tributary terminal A is transmitting the control block 99 to the central, the central terminal is required to wait for reception of the tributary terminal's response. Thus, during this period, according to the BiSynch format, no data will be transmitted.

Upon receiving tributary A's response 99, the central terminal will then address tributary B in the very same manner except that it will not need to use the (PAD) and (SYN) and (EOT) character series as before since the entire system is already initialized. Therefore, in addressing tributary B, the central terminal will send the block 101 which consists of (PAD) characters, (SYN) characters, a couple of tributary B address characters (B), a reader address character (6), (ENQ) characters and another (PAD) character. Tributary B, 95 responds by a text block 103 which includes (PAD) characters, (SYN) characters, a start of heading character (SOH), which indicates that a heading character is to follow, a heading character (HEAD). A heading character contains auxiliary information such as routing or priority information, which will be used by the central to process the text being transmitted. Following the heading character or characters is a start of text character, the text, end of transmission block characters (ETB), a (BCC) character and a (PAD) character.

In response to receiving a text block 103, the central 91 generates control block 105 which includes (PAD) characters, (SYN) characters, and (ACK1) characters and another (PAD) character. The (ACK1) character simply indicates that the text information was received without error. Tributary B terminal 95 may wish to continue to send another block of data and it would do so by generating text block 107, which may include (PAD) characters, (SYN) characters, (STX) characters, the text, (ETX) characters, a (BCC) character and a (PAD) character. As can be seen, the start of heading and heading characters are not used in the second block 107 because the central already knows what to do with the text being received.

Because an end of text character (ETX) was transmitted, the central knows that is the end of the text transmission. Central terminal 91 would then respond by control block 109 which would indicate reception of the text from tributary B without error. Control block 109 would contain (PAD) characters, (SYN) characters, and (ACK0) character and another (PAD) character. In response to this block, tributary B 95 would generate a control block 111 which would include (PAD) characters, (SYN) characters, an end of transmission character (EOT) and another (PAD) character. The end of transmission (EOT) character in block 111 being sent by tributary B 95 to the central terminal 91 indicates that tributary B has nothing further to send.

Accordingly, the central terminal 91 starts its polling sequence over again by sending out block 113 which is an initialization block and is identical to block 97. If tributary A 93 still has nothing to send to central terminal, it will again send a control block response 115 which includes (PAD) characters, (SYN) characters, an (EOT) character and another (PAD) character. Central terminal 91 will then again send a polling block 117 to tributary B 95 which is identical to the polling block 101.

Figure 7:
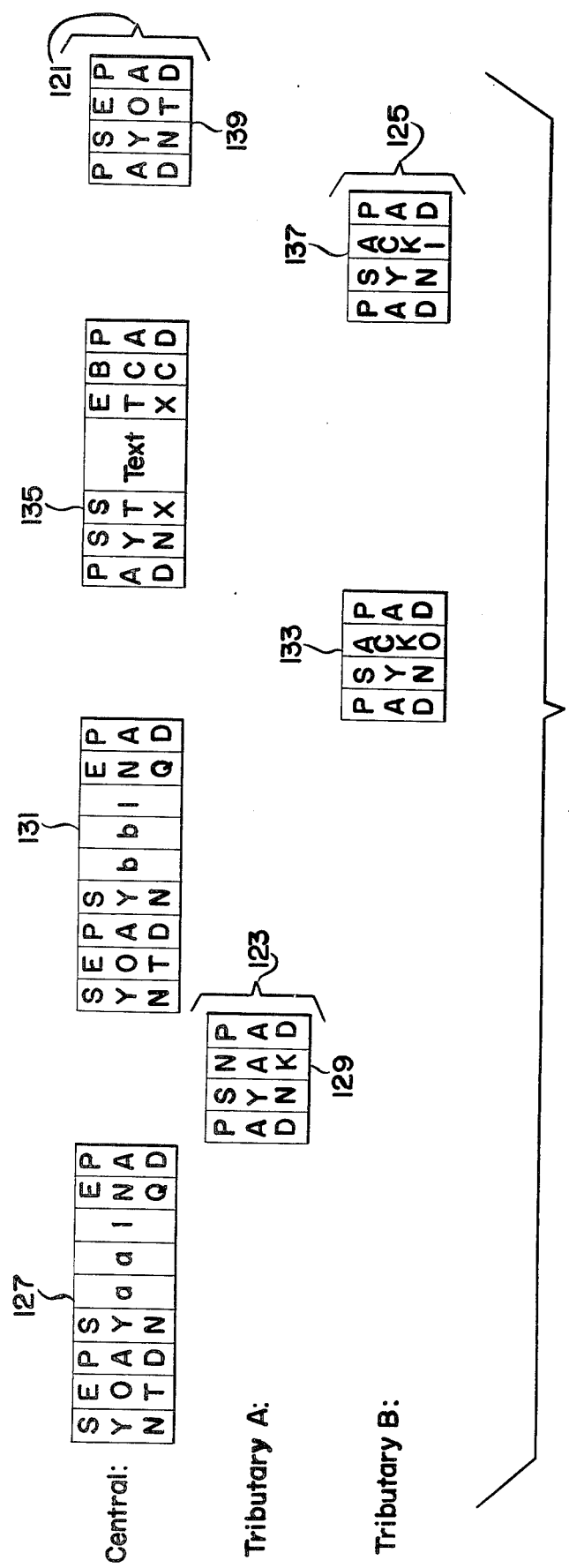

FIG. 7 illustrates the formatting of message traffic between a central and two tributaries 123 and 125 in a selection sequence. The selection sequence, it will be remembered, is a sequence by which the central terminal 121 inquires of tributary terminals like 123 and 125 in the data link whether they are able to receive data from the central. In starting the sequence, the central terminal 121 sends an initialization block 127 which may contain (SYN) characters, (EOT) characters, a (PAD) character, another (SYN) character, a pair of tributary identification characters (a), a terminal equipment identification character (1) indicating a printer, for example, an (ENQ) character and another (PAD) character.

Because tributary A terminal 123 was addressed, tributary A would respond by a control block 129 which may include (PAD) characters, (SYN) characters, a negative acknowledgement character (NAK), and another (PAD) character. The (NAK) character indicates to the central terminal that tributary A is not ready to receive text from the central terminal 121.

The central terminal may then inquire of tributary B by sending a control block 131 which would include (SYN) characters, (EOT) characters, a (PAD) character, another (SYN) character, several tributary address characters (b), a terminal equipment identification character (1), an (ENQ) character and another (PAD) character. Since tributary B 125 was addressed it responds by control block 133 which includes (PAD) characters, (SYN) characters, an (ACK0) character and another (PAD) character. The (ACK0) character is an affirmative acknowledgement which indicates to the central terminal 121 that tributary B is ready to receive text from the central terminal. In response to control block 133, central terminal 121 would transmit its data in a text block 135 which would include (PAD) characters, (SYN) characters, an (STX) character, text, and (ETX) character, (BCC) character and a (PAD) character.

Upon receiving block 135, if no errors have occurred in the transmission, as checked by the receiving tributary B by the use of the block check characters, tributary B would respond by sending control block 137 to the central. Control block 137 would include (PAD) characters, (SYN) characters, an (ACK1) character and another (PAD) character. The (ACK1) character indicates that the previously transmitted text block was received without error. In response to block 137, central terminal 121 would transmit a control block 139 which would consist of (PAD) characters, (SYN) characters, an (ETX) character and another (PAD) character that would signal to tributary B terminal 125 that central did not wish to send any more data.

The above illustration of message formats in the BSC two-way system is for point to point and multi-point data links. If the text to be transmitted in such data links is to be highly secure, it must be encrypted. If encryption is to occur according to the U.S. National Bureau of Standards DES algorithm implementated in the cipher feedback mode, the data block format for a text block 141 suggested by the National Bureau of Standards, as illustrated in FIG. 8, must be used. Data block 141 comprises (SYN) characters 143, (STX) characters 145, an initialization vector (IV) 147, which will be anywhere from 6 to 8 bytes in size, each byte being 8 bits in the BSC format, a text block 149, which is encrypted and an (ETX) character 155 which is also encrypted, and a block check character BCC 153 which may be encrypted or sent in the clear.

The initialization vector 147 is utilized at the tributary receiver for initializing the deciphering process so that the text characters 149 that are transmitted in the text block 141 can be correctly deciphered as will be more fully explained hereinafter. The DES algorithm when implemented in the cipher feedback mode requires that the enciphering algorithm and the deciphering algorithms start from exactly the same initial state. Thus the initialization vector characters 147 are used to start the cipher process that results in the cipher text 149 at the transmitting central terminal.

The very same initialization vector then is placed into the cipher text block 141 between the (STX) character 145 and the cipher text 149 so that it can be received by the receiving tributary terminal prior to the reception of the cipher text 149 for the purpose of initializing the DES decipher algorithm at the tributary in preparation for deciphering of the cipher text 149. As can be seen from the cipher text format 141 of FIG. 8, the inclusion of the initialization vector 147 between the (STX) character 145 and the cipher text 149 of the text block reduces the throughput of the data link by the length of the initialization vector 147.

As can be ascertained from looking at the message formatting for traffic in a point to point and multi-point system, as illustrated in FIGS. 4, 5, 6 and 7, in a BSC protocol there is a considerable length of time between messages in a turnaround situation. There is always a turnaround situation in existance because in BSC a response back from a terminal is required either in polling, selection or contention modes before it can again transmit in the same direction.

The present invention takes advantage of this delay between messages in the same direction by placing the initialization vector as well as additional control information at the trailing end of a text block as illustrated in FIG. 9 by text block 155. A message format, according to the present invention utilizing BSC criteria, would include (SYN) characters 157 followed by (STX) characters 159, the text 161, (ETX) characters 163, (BCC) characters 165, (INF) characters 167, initialization vector 169, a second end of text character (ETX') 171 and a second block check character (BCC') 173.

The text characters 161, the end of text character 163 and the block check characters 165 of the text block 155 would be encrypted according to the DES algorithm in a cipher feedback mode. The trailing control characters such as (INF) character 167, the initialization vector 169 and the second (ETX') character 171 and (BCC') character 173 would be transmitted in the clear as would the (SYN) characters 157 and (STX) characters 159 that starts the message block 155.

As was discussed in connection with the encrypted message format illustrated in FIG. 8, use of the DES encryption algorithm in the cipher feedback mode requires the transmitting terminal to send an initialization vector to the receiving terminal. Prior to the reception of the cipher text by the receiving terminal, the initialization vector is used to place the state of the cipher algorithm at the receiver in the identical state that the cipher algorithm was at the transmitter at the time it began to encrypt the cipher text being transmitted. It is for this reason that the cipher text block of FIG. 8 shows the initialization vector characters appearing in the body of the block just before the text characters.

The cipher text block 155, according to the present invention, places the initialization vector 169 as well as additional information, end of text and block check characters at the trailing end of the cipher text block. The present invention contemplates the deciphering receiver acquiring the initialization vector at the start of a message transmission from a previous cipher text block and using that initialization vector to initialize its ciphering algorithm in preparation for reception of the next text block.

Thus, referring to FIG. 9, the cipher text block 155 is assumed to be the second text block in a series. If that is the case, the initialization vector 169 at the trailing end of the text block 155 is utilized by the cipher algorithm at the receiver to initialize the algorithm for the cipher text block (not shown) which will follow the cipher text block 155. Needles to say, at the very state of data transmission, either in a polling or selection mode in a multimode system, the central terminal, when transmitting the initialization control block could include the first initialization vector as well. All subsequent initialization vectors will then be transmitted during the time that a tributary terminal is responding to the central, thereby greatly increasing the throughput capabilities of the system as compared to the prior art cipher text message format shown in FIG. 8.

In certain multi-point data links, intermediate nodes are utilized. Although such a system is not illustrated in the drawings, such a system may be simply explained as a series of reception and transmission points along the transmission medium between the transmitter of the cipher text block and the receiver of the cipher text block. In many such systems, these intermediate nodes are designed to check the transmitted text for transmission errors by the use of the block check characters (BCC) that follow the end of text or end of transmission block characters. The cipher text block of FIG. 8 would not permit the intermediate nodes to perform such a function because the (ETX) characters are encrypted, and the (BCC) characters are preferably encrypted for security reasons. These intermediate nodes do not have access to the key nor are they capable of a deciphering process if they did have access to the key. Transmission error checking at these intermediate nodes is therefore quite difficult and cumbersome.

The present invention contemplates the transmission of an additional end of text and block check character following the initialization vector 169 of the cipher text block 155. The second end of text character (ETX') 171 and block check character (BCC') 173 are transmitted in the clear. The block check character (BCC') 173 is tied to the encrypted version of the text block 155 which includes the cipher text 161, enciphered (ETX) character 163, the enciphered (BCC) character 165 as well as the clear (PAD) character 167, if present and the clear initialization vector 169. Therefore, the entire series of encrypted and clear characters can be checked for transmission error at the intermediate nodes of a multi-node network. The intermediate nodes can check a received message block for transmission error without to decipher the cipher text. This can also occur at the ultimate receiver which has the capability of deciphering the cipher text as well as the block check character 165 which is also enciphered.

The (INF) characters 167 of the cipher text block 155 according to the present invention can include any one of a series of characters illustrated as follows:

[INF]⇌[SEQ][ABORT][SIG]

The (INF) character could therefore be sequence characters [SEQ] which is nothing more than an optional number, one or two characters long, which is encrypted. The receiver deciphers the sequence character (SEQ) and ensures that the sequence of the multi-block message is in order. Thus for the first cipher text block in a series, the sequence character would indicate that this is the first cipher text block. Utilization of the sequence character as contemplated by the present invention facilitates the detection of playback interference. Playback interference is the use of a tape recorder device to repeat, in an unauthorized manner, the received encrypted messages and feeding it to the cipher feedback decryptor. If the key has not been changed, the receiver will correctly decrypt it and use it for certain types of messages like funds, deposits, merchandise orders, etc. This would have disasterous results in that two orders, for exsample, two deposit requests, instead of one, is received by the deciphering receiver.

Use of the abort (ABORT) character in the cipher text block 155 according to the present invention is very advantageous. The (ABORT) character in the position of (INF) characters 167 of the cipher text block 165 can be transmitted in the clear. If a transmission error had occurred in the cipher text, the receiving decryption device would not be able to detect the end of text character 163 and normally would continue to decipher or attempt to decipher all subsequent characters. With the use of an (ABORT) character in the position of (INF) character 167 of the cipher text block 155, the receiver would detect the (ABORT) character which would signal the concurrence of a transmission error to the receiver and allow the receiver to stop the decipher process.

In a multi-point data link system, the (ABORT) character can also be used to identify the end of a message for those terminal units in the link that do not have the correct key. In other words, if the central transmitter/receiver terminal is talking to a tributary A, utilizing A's key, then tributaries B and C for example, which are attempting to decipher a cipher text which was encrypted according to key A would not be able to decipher the cipher text correctly by use of their keys B and C thereby failing to detect the end of text character 163. Accordingly, failure to detect the end of text character 163 prior to the occurrence of the (ABORT) character at position 167 of the cipher text block 155 would indicate that the message was not intended for these particular receiver terminals.

The signalling (SIG) characters of the (INF) could be any information that the transmitter may desire to communicate to the receiver, such as diagnostic information or new keys.

As illustrated in FIGS. 2 and 3, a pair of encryptor-decryptor devices are required for transmitting cipher text from one end of a data link to another. These encryptor-decryptor devices can be implemented either through dedicated specialized circuitry, or they may be a microprocessor based device which operates according to firmware instructions for the purpose of performing the encryption-decryption algorithm and software instructions for formatting or responding to the text blocks, according to the protocol being used, such as the BSC protocol described in this application.

The preferred embodiment of the present invention is a microprocessor programmed in firmware to execute the cipher/decipher DES algorithm and software programmed to format the cipher text blocks according to the format of the invention illustrated in FIG. 9. In such an environment, the cipher/decipher algorithm is actually executed as a subroutine of the control software which manages the transmission and reception of the cipher text blocks 155.

Figure 11:
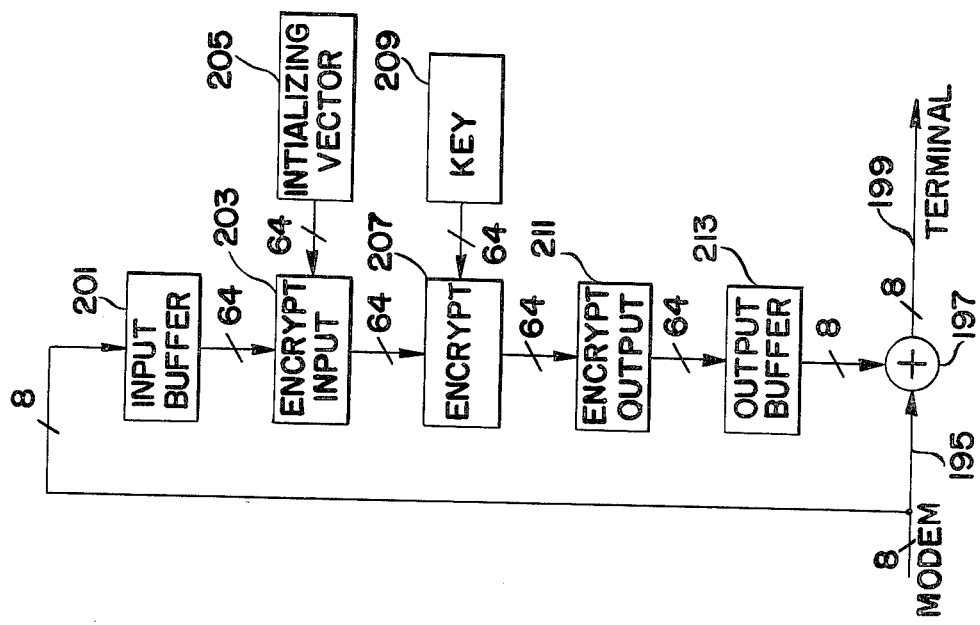
FIG. 11 is a block diagram illustration of the implementation at the receiving end of the decipher process according to the present invention of the National Bureau of Standards DES algorithm.
Figure 10:
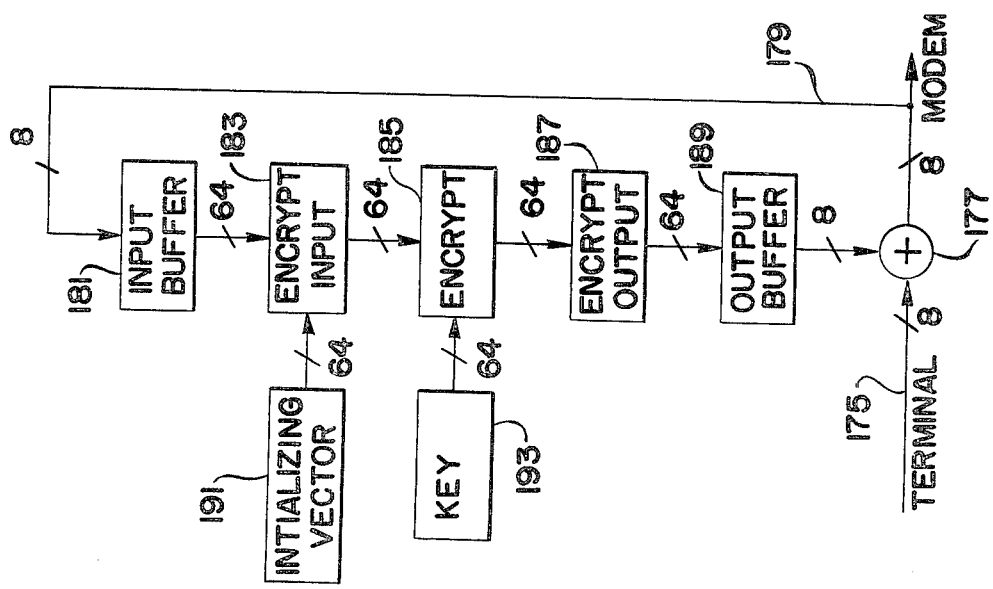
FIG. 10 is a block diagram illustration of the implementation at the transmitting end of the cipher process according to the present invention of the cipher feedback National Bureau of Standards DES algorithm.

FIG. 10 illustrates the transmission cipher routine for the DES algorithm in the cipher feedback mode. FIG. 11 illustrates the decipher routine which would be executed at the receiver.

Referring first to the encryption of data received from a transmitting terminal (FIG. 10), the clear text would be received from the terminal (not shown) over an 8-bit parallel line 175 which is Ex OR'd by way of 16-bit input Ex OR gate 177 with the output of output buffer 189. The resulting 8 bits on line 179 is the cipher text which is supplied to a modem (not shown) for transmission. This resulting output is additionally fed back to input buffer 181. This feedback procedure is continued until the input buffer 181, which is a 64-bit buffer, is completely full. At that time, the output of buffer 181 is fed to the encryptor input register 183. The contents of the encryptor input register 183 is supplied as a 64-bit parallel word to the encrypt algorithm 185 which will be explained hereinafter. The resulting cipher process having been performed, the resulting 64-bit word is supplied to the encrypt output register 187. An output buffer 189 removes the contents of the encrypt output register 87 and supplies the contents thereof to Ex OR gate 177, sequentially in 8-bit bytes.

The encryption process performed by the encrypt function 185 is controlled by a 64-bit key that is transferred from the key register 193 to the encrypt algorithm process 185.

The decipher process is the exact duplicate of the cipher process as can be seen from FIG. 11. The only difference is the process starts with the cipher text rather than clear text. Cipher text is received from a modem (not shown) in an 8-bit format over line 195 and supplied as an input to Ex OR gate 197 and as an input to input buffer 201. Input buffer 201 is a 64-bit buffer that is loaded by 8-bit bytes. When fully loaded, the contents of input buffer 201 is supplied to the encrypt register 203. When the cipher process is to start, the contents of the encrypt input register 203 is supplied to the cipher algorithm 207 which operates on the received cipher text, as directed by the key supplied from key register 209 to provide a 64-bit word to encrypt output register 211. The contents of output register 211 is removed by output buffer 213 and supplied in 8-bit bytes to Ex OR gate 197 where it is 0'rd with the input cipher text to provide the clear text in 8-bit bytes on line 199. The Ex OR gate 197 actually performs the decipher function.

The present invention utilizes the DES encryption algorithm in the cipher feedback mode at both the transmitter and receiver end. The very same key bits are used during the decipher procedure as was used during the encipher procedure. Thus, the only difference between the encipher process and the decipher process is the encipher process starts with clear text, while the decipher process starts with the cipher text.

In order for the decipher process to work, the decipher process at the receiver (FIG. 11) must start with the same 64-bit word that the cipher process at the transmitter end (FIG. 10) starts with. For this reason, prior to the cipher process starting, an initialization vector is loaded into the encryptor input register 183 from initialization vector register 191. The initialization vector is a random number less than or equal to 64 bits generated in a well known manner. Once the initialization vector is loaded into the encrypt input register 183, it is disgarded. Prior to being loaded into the encrypt input register 183 it was placed into the previous cipher text block which was transmitted to the receiver. At the receiver, it was supplied to the initialization vector register 205 to be loaded into the decrypt input register 203 prior to the reception of the next cipher text.

As indicated in the above discussion with relation to the cipher text message format of FIG. 9 according to the present invention, the receiver initialization vector register 205 is loaded by the initialization vector form the trailing end of a previously received cipher text block. Thus, the decrypt portion of the receiver/transmitter is prepared well in advance to decipher the next to be received cipher text block.

Figure 12:
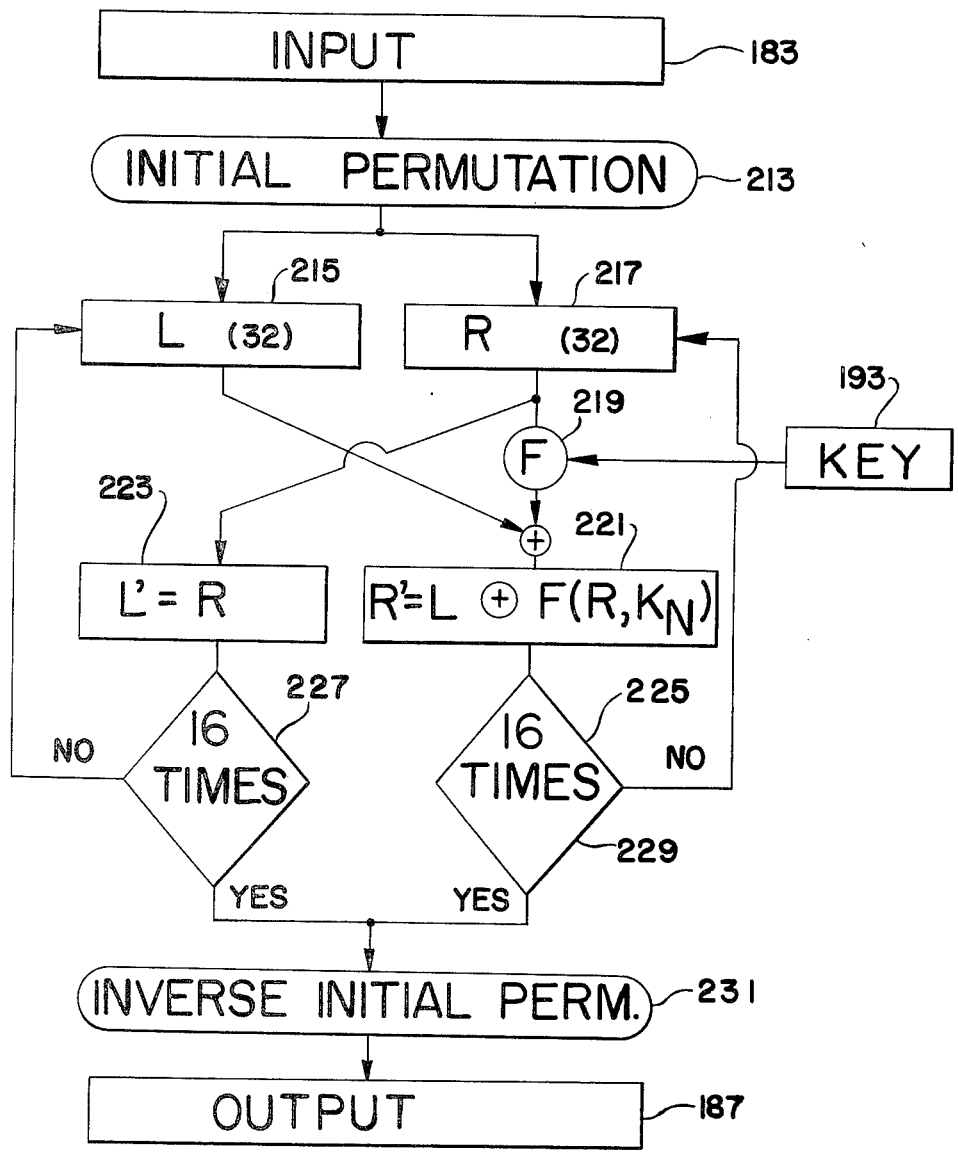
FIG. 12 is a flow chart diagram illustration of the process of the National Bureau of Standards DES algorithm.

The encrypt procedure 185 as well as the decrypt procedure 207 is a firmware controlled subroutine of the major control program of the encryption-decryption devices of the data link. Both procedures are identical. Execution of the algorithm is generally illustrated in FIGS. 12 and 13.

The algorithm works on a 64-bit input in encrypt input register 183. The 64 bits undergo an initial permutation function 213 which is simply a prescribed sequence of reordering the 64 bits. The reordered 64 bits are then split into 32 bitseach and supplied to a left and right register 215, 217 respectively. The output of the right register is then supplied to a second left register 223 in addition to being combined with the key stored in key register 193 in a certain defined combining function (F) 219 (illustrated in FIG. 13). The result of this combining function of the 32-bit word is then Ex 0'rd in Ex OR gate 221 with the contents of the left register 215 and supplied to the second right register 225.

This particular sequence is performed sixteen times, which is detected by logic function 227 for the second left register and logic function 229 for the second right register 225. If it has been accomplished sixteen times, the contents of the second left register 223 and the second right register 225 is supplied to a permutation function 231 which is the inverse of the initial permutation 213. The results of the output permutation function 231 is then supplied to an encrypt output register 187, as the cipher text.

Figure 13:
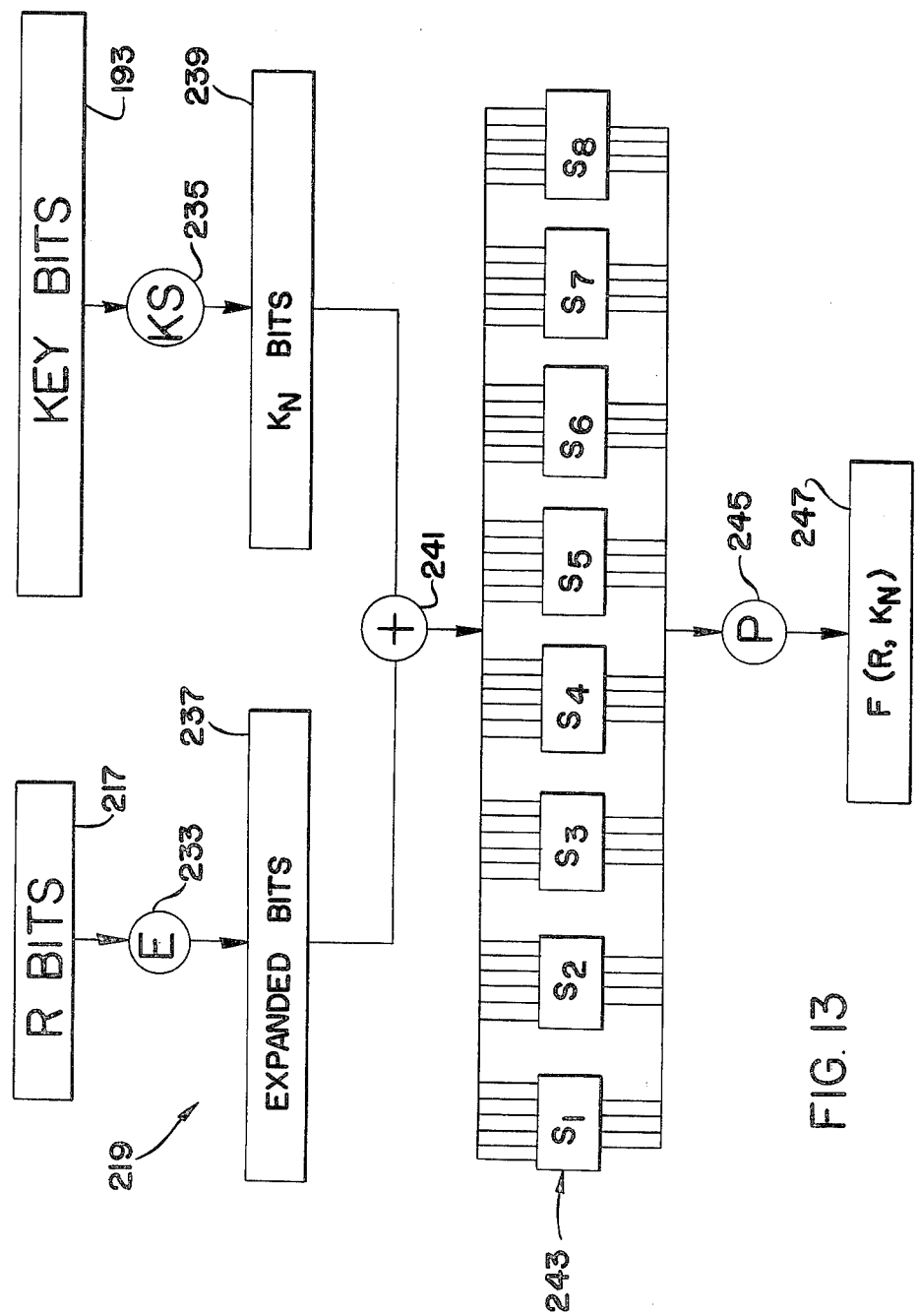
FIG. 13 is a flow chart diagram illustration of the process of the combination function (F) utilized in the implementation of the execution of the DES algorithm in FIG. 12.

The combining function (F) 219 is illustrated in FIG. 13. The (F) function combines the 32 bits in the right register 217 with up to 64 bits of the key in key register 193 in a certain manner. The 32 bits of the right register 217 are expanded by an expansion function 233 to a 48-bit word which is stored in register 237. Up to 64 bits of key 193 are compressed in compression function 235 to a 48-bit word which is stored in register 239. The two 48-bit words from register 237 and 239 respectively are Ex 0'rd together by OR gate 241. The resulting 48 bits are supplied to selection circuitry 243 in which there are 8 unique selection functions which take a 6-bit block input and yield a 4-bit block output according to a specified defined table. The 32-bit output from the eight selection functions is permutated by a permutation function 245 according to a uniquely defined table to produce the 32 bits in register 247. The bits in register 247 are Ex 0'rd in Ex OR gate 221 with the 32 bits in the left register 215 (FIG. 12).

The exact definition of this algorithm, as was noted in the introductory portion of this application, is well known and has been published in the various publications referred to earlier. Therefore, further description of the algorithm itself is not deemed necessary. The algorithm itself does not constitute the present invention.

Figure 14:
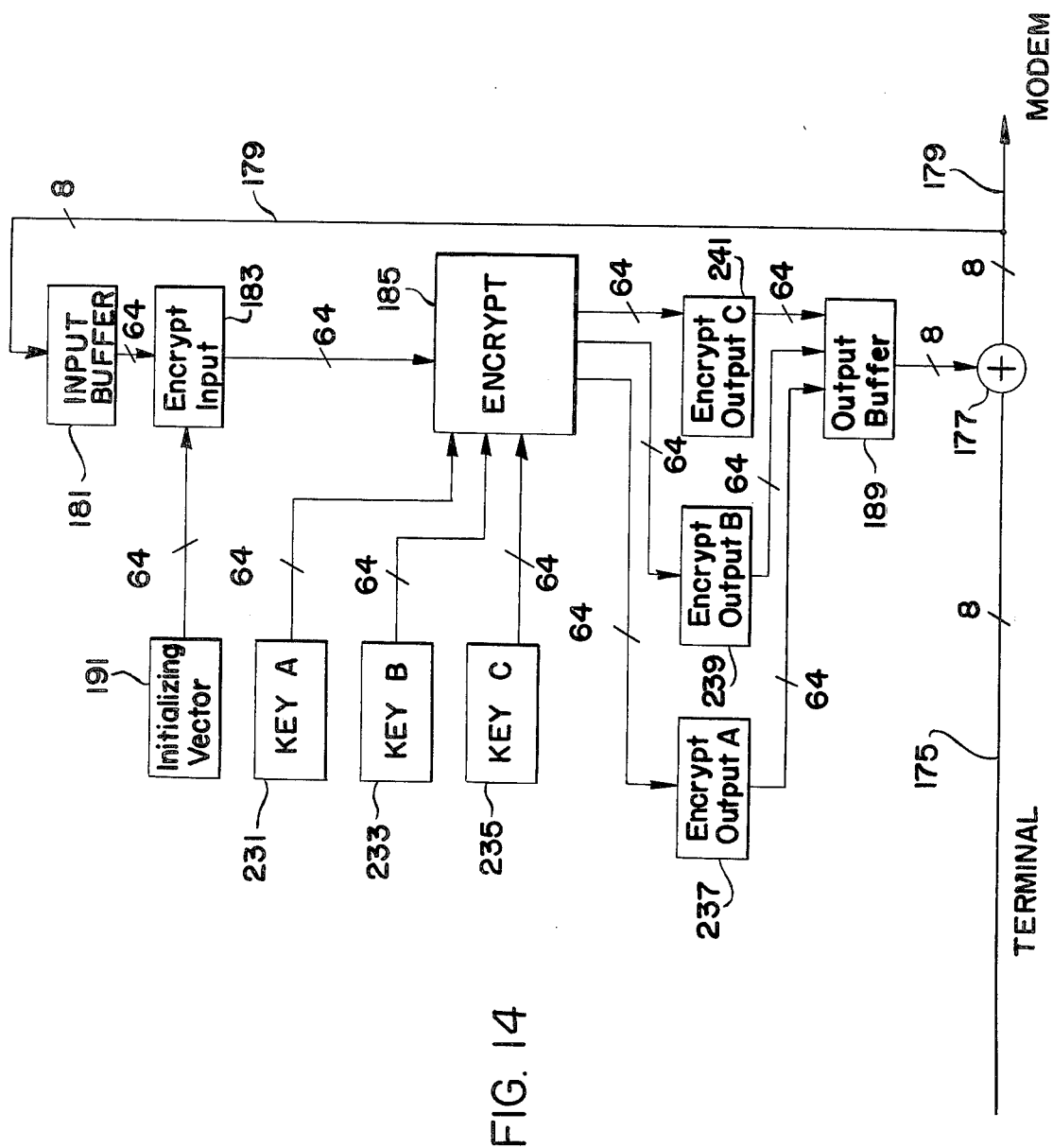
FIG. 14 is a block diagram illustration of an implementation at the transmitting end of the cipher process according to the present invention of the National Bureau of Standards DES algorithm in a cipher feedback mode for a multi-point data link wherein each tributary terminal has its own key assignment.

Referring now to FIG. 14, the encryption procedure and associated hardware in a central encryptor/decryptor device which has the capability of providing a separate secret key for a plurality of receivers in a multipoint data link is shown. The encryption procedure is the same as illustrated for a single key encryptor/decryptor device as shown in FIG. 10, except that a multikey encryptor/decryptor device has a separate key register for each key and a separate output register for each key. Thus, the embodiment of FIG. 14 illustrates a three-key system wherein key A is stored in register 231, key B is stored in register 233 and key C is stored in register 235. The output of the encrypt algorithm 229 is supplied to respective encrypt output register A 237, encrypt output register B 239 and encrypt output register C 241.

The remaining hardware and functions are similar if not identical to those illustrated in FIG. 10. The operation of the embodiment of FIG. 14 is the same except that different keys may be utilized as called upon for each different encryption operation as previously described.

Figure 16:
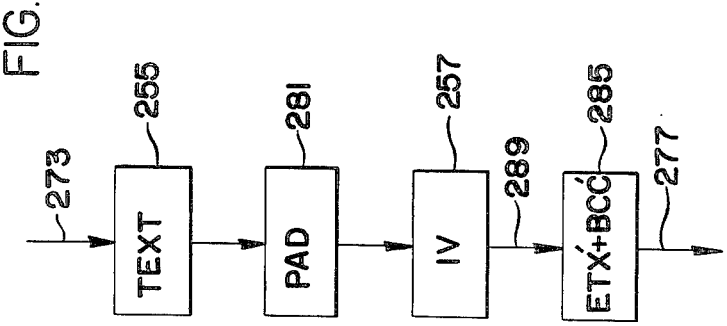
FIG. 16 is a portion of a flow chart which may be added to the flow chart of FIG. 15 which illustrates the handling of additional signaling information besides the initialization vector at both the receiving and transmitting end of the data link.
Figure 15:
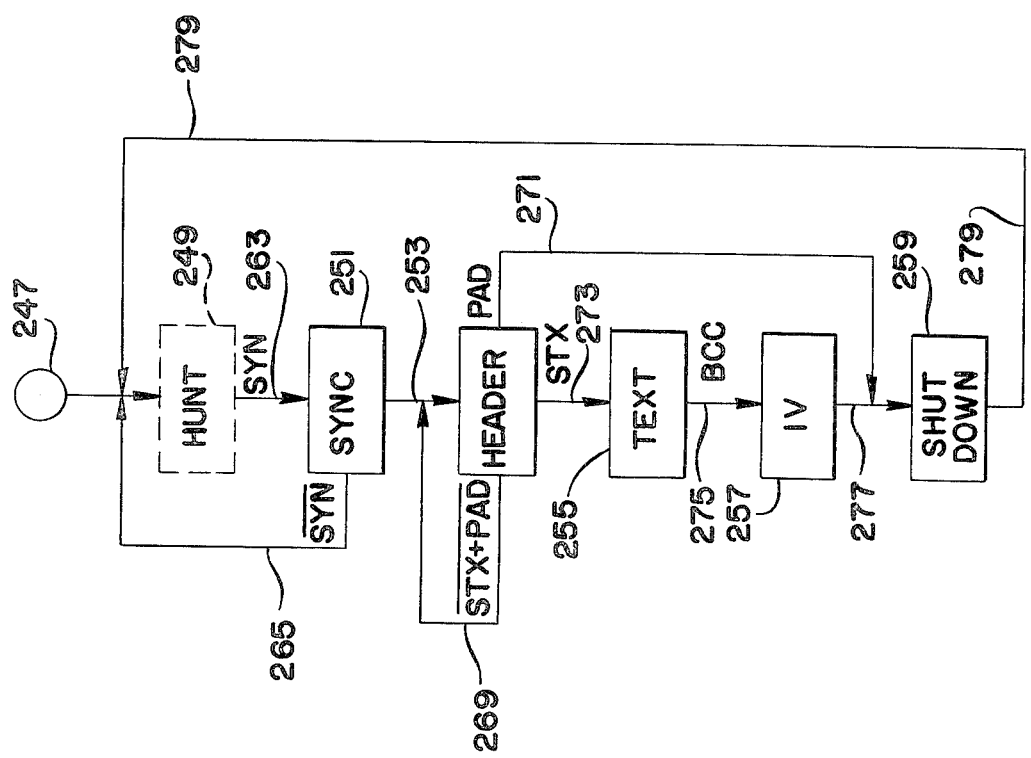
FIG. 15 is a flow chart illustrating the program used by a microprocessor of the encryptor device to handle the protocol of a text block at either the receiving or transmitting end of a data link.

The programming for each microprocessor based encryption/decryption device which is directed towards the transmission and reception of the cipher text, is illustrated by the flow chart of FIG. 15 and 16. The flow chart of FIG. 15 illustrates the procedure followed in both the transmission-encryption mode as well as the reception-decryption mode.

After start 247, if the encryptor/decryptor is in a receive mode, it goes into a hunt state 249 wherein it looks for the reception of (SYN) characters 263. In the receive mode, the sync state 251 would utilize the incoming synchronous information to set its internal clocking scheme. If the incoming information is not detected as (SYN) characters by the synch mode 251, an instruction 265 is given to go back to the hunt state 249.

If the encryptor/decryptor is in the transmit mode, synch state 251 would be instructed to generate the (SYN) characters for transmission. If the message block was to be transmitted, sync state 251 would cause initiation of the header state upon generation of the sync characters.

In the receive mode, the sync state 251 passes all control characters following the (SYN) character along to the header state 53. If a start of text character (STX) is received by the header state 53, the characters following the start of text character would be passed on to the text state 255 to be processed. The header state also looks for other control characters and responds to those characters accordingly. If, rather than a text block, a control block was being received, a (PAD) character would signal the end of the control block causing the header state to initiate a signal 271 to start shut-down procedure 259 of the receiver. If the header state is active and no start of text or (PAD) characters are received 269, then it continues to look for and process the characters being received as control characters.

In the transmit mode, the header state 253 would generate the appropriate start of text or other control characters needed in the cipher text block which proceeds the text information.

All characters following the (STX) character is processed by the text state 255. In the receive mode, the text state calls the cipher subroutine into use. In the transmit state, the cipher subroutine will be called into use. The cipher process is continued until the block check character (BCC) is either deciphered or received. Processing of the block check character causes the initialization vector state 257 to be activated wherein the 4 to 8 bytes of the initialization vector are either generated (transmission mode) or are loaded into the DES algorithm buffer (receptionn mode). On the last byte of the vector being processed, the process goes into the shut-down state 259. That is the transmitter or receiver, as the case may be, will stop its transmission or reception. Completion of the shut-down state 259 causes a signal to be generated 279 that starts the routine over again with the hunt procedure 249.

Referring now to FIG. 16, the additional functions of (INF), (ETX) and (BCC) are shown as included between the initialization vector state (IV) 257. Addition of these two states processes the (INF) characters 167 (FIG. 9) and the (ETX) 171 and (BCC) characters (FIG. 9) that can also be part of the trailing appendage.

Upon the (STX) character being detected during either reception or transmission, the text state 255 is entered into and the data being transmitted caused to be enciphered or, if its received, caused to be deciphered. At the processing of the block check character, the text state moves into the (INF) state 281 wherein, in reception, the (INF) signals are processed according to their character whether they are (SEQ), (ABORT) or general control signals (SIG) as explained above. In the transmit mode, (INF) state 281 causes the generation of the signals as appropriate to be placed immediately before the initialization vector of the cipher text block to be transmitted. Upon the processing of these (INF) signals, the initialization vector state is entered whereupon the vector bytes are processed either by being generated or by being received and entered into the DES algorithm register. At the end of the last byte being processed, the (ETX') and (BCC') state 285 is entered into wherein in transmission these two characters are generated to immediately follow the initialization vector. In reception, these two characters are detected and used as appropriate. If they are received at the end of a multi-node data link, they may simply be disgarded, their main function being to permit the cipher text to be checked for transmission errors at intermediate nodes of the data link without resorting to decipherment of the message blocks.

What has been described is a message format for cipher text blocks within a BSC protocol. It is flexible, and can be used in point to point and multi-point data links as well as data links that have intermediate nodes which nodes are capable of checking for transmission error. The message format of the present invention permits such checking to occur without the intermediate nodes having to decipher the text message. In addition, the error checking capability of the system is enhanced as a result of the structure of the message format. The message format is structured in a manner that adds a considerable amount of information necessary to the cipher text block, such as the initialization vector, without decreasing the throughput of the BSC protocol system. It should be understood, of course, that the foregoing disclosure relates to a preferred embodiment of the invention and that modifications may be made therein without departing from the spirit and scope of the invention as set forth in the appended claims.

I claim:

1. In a data link communication system utilizing a synchronous protocol and having an encryption/decryption device at each end of the data link, the improvement in said encryption/decryption device comprising:
   means for generating a multi-bit random number to be used as an initialization vector;
   means for enciphering message text according to the DES algorithm in the cipher feedback mode; and
   means for supplying said initialization vector to said enciphering means prior to the start of the next message enciphering, and supplying the same initialization vector to the receiving encryptor/decryptor device as the trailing end of the previous encrypted message, whereby said initializing vector is supplied to the deciphering portion of the receiving encryptor/decryptor device for the purpose of initializing it for reception of the next cipher.

2. The improvement of claim 1 wherein in addition to the multi-bit initialization vector said supplying means provide an information word at the trailing end of the encrypted message.

3. The improvement of claim 2 wherein the information word comprises ABORT characters.

4. The improvement of claim 2 wherein the information word comprises ETX characters and BCC characters transmitted in the clear.

5. The improvement of claim 2 wherein the information word comprises SEQ characters.

6. The improvement of claim 2 wherein the information word comprises SIG characters.

7. In a data link communication system utilizing a synchronous protocol and having a master encryption/decryption device at a central location and an encryption/decryption device at each of a plurality of tributary locations, said master encryption/decryption device storing a plurality of multi-bit secret keys, one for each of the tributary encryption/decryption devices, the improvement in the encryption/decryption device comprising:
   means for storing a multi-bit random number to be used as an initialization vector;
   means for enciphering message text according to the DES algorithm in the cipher feedback mode;
   means for supplying the initialization vector to said message enciphering means prior to the start of the next message enciphering by said enciphering means; and
   means for supplying the same initialization vector to each of the tributary encryption/decryption devices as the trailing end of the previous encrypted message whereby the initialization vector is supplied to the deciphering portion of each tributary encryption/decryption device for the purpose of initializing it for reception of the next cipher.

8. The improvement of claim 7 wherein in addition to the multi-bit initialization vector said supplying means provides an information word at the trailing end of the encrypted message.

9. The improvement of claim 8 wherein the information word comprises ABORT characters.

10. The improvement of claim 8 wherein the information word comprises ETX characters and BCC characters transmitted in the clear.

11. The improvement of claim 8 wherein the information word comprises SEQ characters.

12. The improvement of claim 8 wherein the information word comprises SIG characters.

13. In a data link communication system utilizing a synchronous protocol and having an encryption/decryption device at each end of the data link, one of the encryption/decryption devices being a master and the other being the tributary device, each encryption/decryption device enciphering and deciphering message text according to the DES algorithm in the cipher feedback mode with the use of a secret key for each data link, the initialization of the master and tributary encryption/decryption device prior to a cipher transmission being controlled by a multi-bit initialization vector genereated at the master encryption/decryption device and transmitted to the tributary encryption/decryption device, the improvement therein comprising: means for supplying the initialization vector to the master encryption/decryption device prior to the start of the next message enciphering; and means for supplying the same initialization vector to the tributary device as the trailing end of the previous encrypted message whereby said initializing vector is supplied to the deciphering portion of the tributary device for the purpose of initializing it for reception of the next cipher.

14. The improvement of claim 13 wherein in addition to the multi-bit initialization vector said supplying means provides an information word at the trailing end of the encrypted message.

15. The improvement of claim 14 wherein the information word comprises ABORT characters.

16. The improvement of claim 14 wherein the information word comprises ETX characters and BCC characters transmitted in the clear.

17. The improvement of claim 14 wherein the information word comprises SEQ characters.

18. The improvement of claim 14 wherein the information word comprises SIG characters.

* * * * *